United States Patent [19]
Harris et al.

[11] Patent Number: 5,085,738
[45] Date of Patent: Feb. 4, 1992

[54] METHOD AND APPARATUS FOR THERMAL CONVERSION OF ORGANIC MATTER

[76] Inventors: Windel L. Harris, P.O. Box 572, Neosho, Mo. 64850; James R. Donnohue, Rte. 6, Box 348-A, Springdale, Ark. 72764

[21] Appl. No.: 520,025

[22] Filed: May 7, 1990

Related U.S. Application Data

[63] Continuation-in-part of Ser. No. 342,056, Apr. 24, 1989, Pat. No. 4,925,532.

[51] Int. Cl.⁵ ........................ C10B 1/08; C10B 47/26
[52] U.S. Cl. ............................ 201/11; 48/92; 48/111; 48/209; 201/3; 201/15; 201/25; 202/219; 423/449; 423/461
[58] Field of Search ............... 201/10, 11, 3, 25, 15; 202/219, 99, 108, 117, 118, 226, 128, 262, 269; 48/92, 111, 209, 86 R; 423/449, 461

[56] References Cited

U.S. PATENT DOCUMENTS

| | | | |
|---|---|---|---|
| 1,237,094 | 8/1917 | Prioleau | 202/226 |
| 3,691,019 | 9/1972 | Brimhall | 202/118 |
| 3,957,958 | 5/1976 | Katz et al. | 423/461 |
| 4,029,481 | 6/1977 | Oliver et al. | 48/111 |
| 4,284,616 | 8/1981 | Solbakken et al. | 201/25 |
| 4,597,772 | 7/1986 | Coffman | 48/111 |

FOREIGN PATENT DOCUMENTS

| | | | |
|---|---|---|---|
| 329160 | 7/1903 | France | 202/219 |
| 2061473 | 5/1981 | United Kingdom | 201/11 |

*Primary Examiner*—Joye L. Woodard
*Attorney, Agent, or Firm*—Litman, McMahon & Brown

[57] ABSTRACT

An apparatus for the thermal conversion and recovery of organic waste materials includes an oxygen-free chamber filled with molten lead and a method of use of the apparatus. The chamber is elongate and inclined so that organic material introduced in a lower portion of the chamber migrates through the molten lead to a higher portion of the chamber due to the organic material having a specific gravity less than that of lead. As the organic material migrates through the molten lead, the material is thermally converted to gaseous and vapor hydrocarbons that are captured in a condenser. The gaseous hydrocarbons are utilized to heat the lead in the chamber and the vapor is condensed to liquid hydrocarbons in the condenser. Residual solids flow to a reservoir connected to the chamber. Light carbon black is drawn into a receiver by a vacuum line located near the top of the reservoir and all other residual solids flow over a reservoir wall.

3 Claims, 1 Drawing Sheet

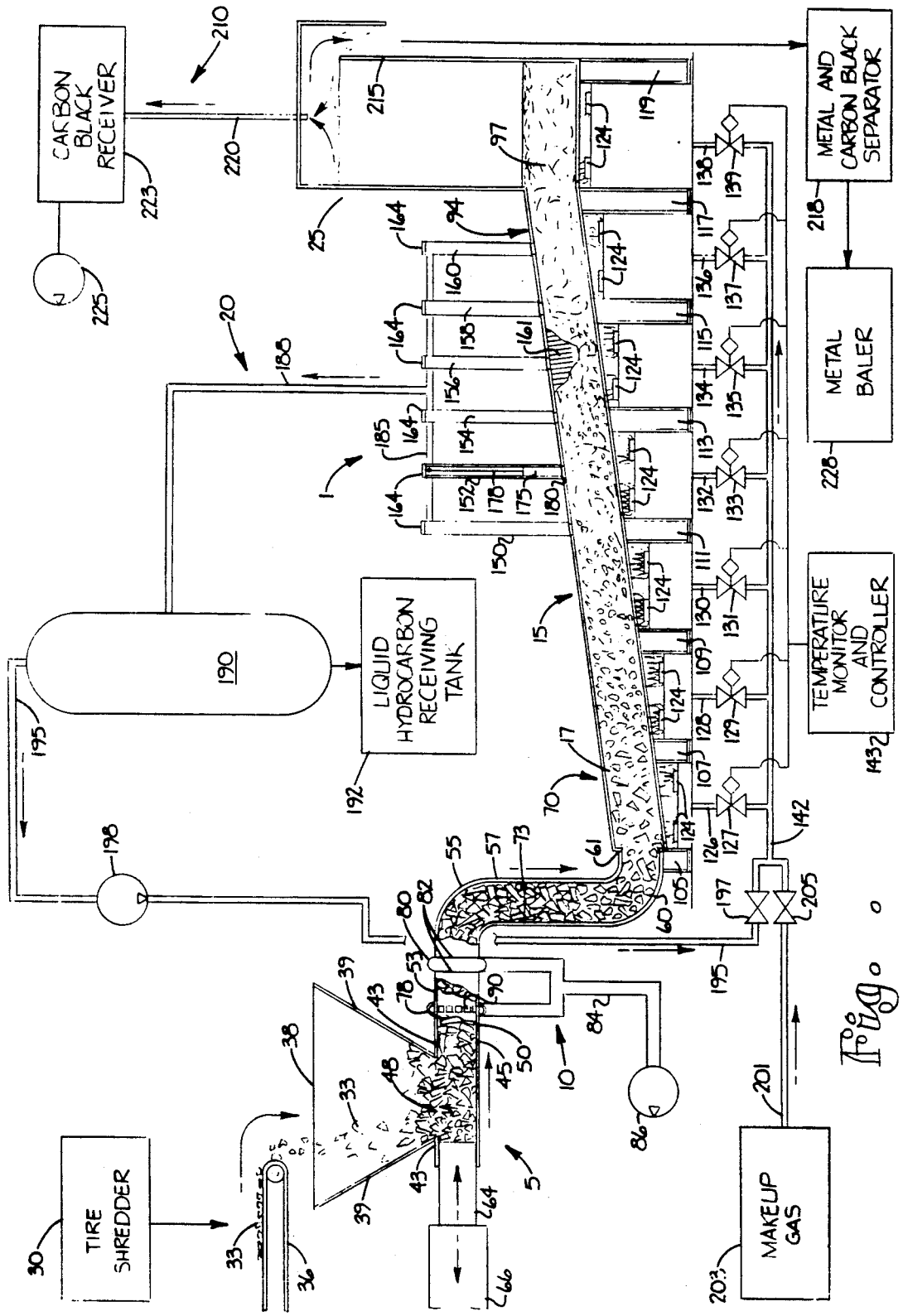

METHOD AND APPARATUS FOR THERMAL CONVERSION OF ORGANIC MATTER

CROSS-REFERENCE TO RELATED APPLICATION

This is a continuation-in-part of co-pending U.S. application Ser. No. 07/342,056, filed Apr. 24, 1989, entitled METHOD AND APPARATUS FOR THERMAL CONVERSION OF ORGANIC MATTER, now U.S. Pat. No. 4,925,532, and being incorporated herein by reference.

BACKGROUND OF THE INVENTION

This invention relates to a process for thermal conversion of organic matter primarily into gaseous and vapor forms and, in particular, to an improved continuous process and apparatus for thermal conversion of rubber vehicle tires and the like utilizing a molten lead bath to yield gaseous and vapor forms that may be further treated to recover useful hydrocarbon liquids.

The need for efficient and ever-improving methods of disposal of waste products has long existed. Modern realizations have shown the need to handle waste products in an environmentally sound manner. Historically, landfills have been utilized as the least expensive manner for disposal, since landfill usage normally requires no more than the collection and transport of the material to the site. This procedure has been followed in many areas which still have sufficient open areas available. However, several factors preclude the employment of landfills. Less and less space now exists in many countries, particularly in and adjacent to urban areas, which areas obviously generate the greatest volume of waste material. Additionally, ever increasing environmental controls are forcing many jurisdictions to seek alternate means for waste disposal, as landfills pollute underlying water tables, etc.

In the case of inorganic matter, it is known to recycle many materials such as glass and metals and the processes for handling these offer little environmental concern. On the other hand, the disposal of waste organic matter has been known to raise many objections. In a landfill, many waste organic materials may decompose and yield harmful products capable of contaminating the soil and ground water. Other organic wastes (such as vehicle tires and the myriad of plastic products) exhibit little or no decomposition in a landfill and, more importantly, are difficult to bury. These latter wastes, in view of their resiliency, tend to work their way to the surface of any manipulated landfill. Many dumps devoted exclusively to tires are located throughout the country—some containing several million tires each. When such tire dumps catch on fire, it often takes weeks to extinguish the smoldering blaze, if it can be extinguished at all, with a most objectionable emission of pollutants usually spreading over tens of thousands of acres.

Several states and other jurisdictions have totally outlawed any landfills. This action dictates that new means must be provided to accommodate the disposal of at least those organic materials which heretofore mostly have been relegated to a landfill or the like. With over 200 million tires being used annually in this country alone, it follows that any disposal method which can utilize tires as an infeed and which yields valuable by-products, will present a unique advancement of the art.

The concept of using molten metal, including lead, for the thermal conversion of organic matter is generally known. Molten metal has been utilized in the distillation of granular wood or coal by submerging the granules in a molten metal bath and passing the granules through the bath, sandwiched between two endless screens. The prior art has not suggested a continuous processing method wherein organic waste material of varying configurations, such as scrap tires, is evaporated in the absence of oxygen and converted to a gaseous state with an extremely high degree of efficiency, both as to speed of processing as well as to the value of the collected hydrocarbons.

SUMMARY OF THE INVENTION

An apparatus is provided for the thermal conversion of organic matter to primarily a gaseous state and a method of use of the apparatus. Organic material to be processed is conveyed to an oxygen free conversion chamber filled with a suitable liquid, adapted to be heated to a temperature of over 650° F. without substantial breakdown or evaporation of the liquid. Lead is a preferred material for the chamber liquid in view of its high boiling temperature and high specific gravity. A plurality of gas burners located below the chamber heat the molten lead in the conversion chamber.

The conversion chamber is tubular in nature and is positioned on an inclination relative to horizontal with the organic material initially conveyed to a low end of the chamber where the material is urged into and submerged in the molten metal. Because the specific gravity of the organic material is less than that of the lead bath, the material migrates along the inclined chamber, through the lead bath, toward a reservoir located at a high end of the chamber. Gaseous hydrocarbons and vapors formed during the migration of the organic material are drawn through vertical tubes connected to the chamber. The vapors that can be liquified at about 70° F. or above are then condensed and trapped in a receiving tank. Hydrocarbons having a lower liquification temperature, especially methane gas, that are emitted from the chamber are also captured and circulated to the gas burners to be burnt and thus used to heat the molten lead. The residual solids floating to the top of the liquid lead, including carbon black and metal, migrate to the reservoir at the upper end of the chamber. A vacuum system draws off a substantial amount of the carbon black and the remaining residual materials flow or are drawn over an edge of the reservoir and are conveyed to other locations for further processing and selective recovery.

OBJECTS OF THE INVENTION

The principal objects of the present invention are to provide an improved method and apparatus for thermal conversion of organic matter; to provide an improved thermal conversion apparatus utilizing gravity rather than a container or the like for transporting waste material through a heated bath; to provide an improved thermal conversion apparatus including a conversion chamber filled with molten lead and inclined relative to horizontal for producing continuous thermal conversion of organic material initially conveyed to a low end of the chamber; to provide an improved thermal conversion process wherein organic matter migrates through a molten lead bath and converts to gaseous hydrocarbons; to further provide such a process wherein shredded vehicle tires are thermally converted to vapor forms that may be condensed and further separated to gasoline, kerosene and heating oil; to further provide such a process wherein residual solids from the thermal conversion of vehicle tires, including carbon black and steel, are captured and separated; to further provide such a process wherein methane gas emitted from the thermal conversion of organic matter is utilized to heat the molten lead bath in the conversion chamber; to provide such a process and apparatus that is relatively simple, utilizes inexpensive equipment and is particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a partially schematic, side elevational view of an apparatus in accordance with the present invention for use in a process also in accordance with the present invention, with portions broken away to show the detail thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

An apparatus in accordance with the present invention for thermal conversion of organic matter, and in particular for thermal conversion of vehicle tires, is illustrated in FIG. 1 and is generally referred to by the reference numeral 1.

The apparatus 1 generally comprises organic matter delivery means, such as illustrated feed mechanism 5, an oxygen removal unit 10, an inclined conversion chamber 15 filled with molten lead 17, hydrocarbon capturing means, such as vent system 20, and a residual solids removal means, such as discharge mechanism 25.

Prior to delivery of organic material to the feed mechanism 5 of the apparatus 1, the material to be processed is prepared by cutting or shredding to relatively small pieces in a shredder such as illustrated by block 30. When vehicle tires are converted in the process of this invention, the ideal size for the tire pieces is approximately two inch square. However, the tire pieces may range in size, and, for example, pieces as large as eight inch square may be fed into the apparatus 1 of the present invention. The tire pieces 33 are then transported to the feed mechanism 5 by a conveyor 36.

In addition to tire pieces 33, organic matter that may be advantageously thermally converted by the apparatus 1 and process of this invention may include any available organic material such as wood, paper products and plastics that volatize or otherwise break down when subjected to heat, preferably between 650° F. and 950° F.

Delivery means within the feed mechanism 5 for transporting tire pieces 33 into the conversion chamber 15 include a receiving bin or hopper 38 having sloped side walls 39 fixedly connected to a top wall 43 of a horizontal receiving channel or trough 45. The channel 45 is rectangular and has an inlet or opening 48 centrally located between the sloping walls 39 of the hopper 38 and adapted to allow tire pieces 33, due to the action of gravity, to slide along the converging, sloping side walls 39 and into the channel 45. The channel 45 is fixedly attached and flow-connected to a cylindrical infeed tube 50 having a first horizontal section 53, a first L-shaped bend 55, a vertical section 57 and a second L-shaped bend 60. At a discharge end 61 of the second L-shaped bend 60, the infeed tube 50 is fixedly attached and flow connected to the conversion chamber 15.

Ram means, such as illustrated ram 64 located within channel 45 and connected to a ram propelling means generally designated by reference numeral 66, reciprocate within the channel 45, pushing and advancing tire pieces 33 into the infeed tube 50. Continued reciprocation of the ram 64 as tire pieces 33 continuously drop into the hopper 38, produces a continuous feed of tire pieces 33 through infeed tube 50, past end 61 and into a first portion or section 70 of chamber 15.

The ram propelling means designated by reference numeral 66 is preferably hydraulic in nature, but may be any suitable device for reciprocating the ram 64. In one particular embodiment of the invention, the ram 64 is capable of pushing tire pieces 33 at a pressure of 390 pounds/square inch, although less pressure is usually required to advance the tire pieces 33 through infeed tube 50 and it is foreseen that the pressure may be varied to accommodate variations in the apparatus 1. However, the infeed tube 50 must have adequate strength to withstand such pressure generated within the tire piece 33 mass urged into the tube 50 by the ram 64. For example, when twenty inch diameter steel pipe was utilized for the infeed tube 50 in one particular embodiment, ⅞ inches was utilized for the wall thickness of the pipe.

If the feed of tire pieces 33 to the apparatus 1 is stopped for some reason, although it is desirable to have feed continuously, molten lead 17 from the conversion chamber 15 may rise into the infeed tube 50 and may rise to the height indicated by horizontal line 73. However, when tire pieces 33 are continuously fed into tube 50, the molten lead level is usually significantly lower than line 73 and preferably does not substantially enter the infeed tube 50. In particular, as the infeed tube 50 is not directly heated and as the end of the conversion chamber 15 adjacent to the tube 50 is maintained at a relatively cooler temperature (for example, about 650° F.) then the rest of the chamber 15, and further, since a majority of the materials in the tire pieces 33 become gaseous at temperatures higher than 650° F., very little or preferably no breakdown or conversion of the tire pieces 33 takes place in tube 50. Therefore, at the discharge end 61 of the tube 50, the lead is molten so that the tire pieces 33 may be advanced therethrough; however, the influx of tire pieces 33 cools and slightly hardens the molten lead 17 and creates a beneficial seal or plug that prohibits gasses and vapors in the conversion chamber 15 from escaping into the horizontal section 53 of tube 50.

Another safety feature of apparatus 1 includes positioning channel 45 and the horizontal section 53 of tube 50 on a level higher than the highest point of conversion chamber 15. If a breakdown of apparatus 1 would occur, gravity would retain the molten lead in the vertical section 57 of tube 50.

The oxygen removal unit 10 includes vacuum-producing means 10 to remove air from the infeed tube 50 as tire pieces 33 are advanced therethrough. The illustrated vacuum-producing means of the oxygen removal unit 10 includes a first collar 78 and a second collar 80, both surrounding and fixedly attached to the horizontal section 53 of tube 50. The first collar 78 is located slightly downstream from hopper 38 and the second collar 80 is located downstream from the first collar 78. Both collars form a seal around the tube 50 alongside edges 82 and are flow connected to a vacuum line 84 and vacuum pump 86. A plurality of axially aligned apertures 90 are located on the infeed tube 50 in flow communication with the collars 78 and 80 that surround the tube 50. Preferably, any air drawn into the tube 50 with the tire pieces 33 is drawn radially from tube 50 through apertures 90 and into collar 78 from around the tire pieces 33, advancing through the tube 50 for the purpose of generally placing the tire pieces 33 entering the chamber 15 in a substantially oxygen-free environment to prevent combustion of hydrocarbons released from the tire pieces 33 and/or potential explosion. Air not drawn into collar 78 is drawn radially into collar 80 through similar apertures (not shown) as the tire pieces 33 advance therethrough. The vacuum in the air line 84 is preferably approximately five inches per square inch negative pressure for adequate removal of oxygen from tube 50. Air drawn into line 84 is pumped by vacuum pump 86 into the ambient air.

The conversion chamber 15 includes the first portion 70 and a second portion 94. The second portion 94 is integral with a reservoir 97. The conversion chamber 15 is cylindrical or tubular and completely filled with molten lead 17. The chamber 15 of a particular embodiment of the invention was constructed from a heavy-duty metal such as twenty inch diameter coil steel pipe having walls ⅜ inches thick. The chamber 15 is located on an inclined axis relative to the horizontal with a preferred angle of inclination of approximately seven to eight degrees, although this angle can be varied with the material being treated by the apparatus to increase or decrease residence time of the material within the chamber 15. The chamber 15 is sometimes referred to herein as an "inclined plane", not because any of the walls are necessarily planar, but because the material being treated follows a generally inclined planar path through the chamber. The length of the chamber 15 may be determined by the volume of tire pieces 33 converted therein each day. An auger system (not shown) may be placed within the chamber 15 and utilized to speed up or slow down the migration of organic matter through the chamber 15 so as to increase agitation of the organic matter with the heated liquid. Although the chamber 15 of the present embodiment is described as circular in cross-section and is shown as being uniform and continuous along the length thereof, it is foreseen that other shapes could be utilized advantageously in accordance with the invention.

A plurality of support structure assemblies 105, 107, 109, 111, 113, 115 and 117 are fixedly attached to and support the chamber 15. Also, the assembly 117 and a support structure assembly 119 are fixedly attached to and support the reservoir 97. Heating means, such as the illustrated plurality of gas burners 124, are located directly below chamber 15 and reservoir 97 and inbetween each of the support assemblies 105, 107, 109, 111, 113, 115, 117 and 119.

Each set of burners 124 located between each of the adjacent support assemblies 105–119 is connected to a separate fuel line and controlled by a separate valve. Burners located between support assemblies 105 and 107 are connected to fuel line 126 and valve 127, burners located between support assemblies 107 and 109 are connected to fuel line 128 and valve 129, burners located between support assemblies 109 and 111 are connected to fuel line 130 and valve 131, burners located between support assemblies 111 and 113 are connected to fuel line 132 and valve 133, burners located between support assemblies 113 and 115 are connected to fuel line 134 and valve 135, burners located between support assemblies 115 and 117 are connected to fuel line 136 and valve 137 and burners located between support assemblies 117 and 119 are connected to fuel line 138 and 139. Fuel lines 126, 128, 130, 132, 134, 136 and 138 are fed by a main fuel line 142.

A temperature monitor and controller 143 is operably connected to multiple temperature sensors (not shown) located at various points along inside the chamber 15 and reservoir 97 and to the valves 127, 129, 131, 133, 135, 137 and 139. The temperature controller 143 coordinates with the temperature monitors 143 and with each of valves 127, 129, 131, 133, 135, 137 and 139, allowing an operator to maintain a desired temperature of the molten lead 17 within various portions of the chamber 15 and reservoir 97.

In the front portion 70 of the chamber 15 near end 61 of the infeed tube 50, it is preferable to keep the molten lead at a temperature between 650° F. and 700° F., and such a temperature is generally maintained by controlling the fuel passing through valve 127. Fuel passing through valves 129, 131, 133, 135 and 137 is controlled such that the temperature of molten lead 17 within the chamber 15 between support assemblies 107 and 117 is preferably kept at approximately 950° F., so that the tire pieces 33 break down and hydrocarbons therein become gaseous. The temperature in the chamber 15 may be increased uniformly from the lowest temperature at the lower end to the highest temperature at the beginning of the vent system 20 and then maintained at the highest temperature to near the reservoir 97.

Fuel passing through valve 139 is controlled such that the temperature of the molten lead 17 within the reservoir 97 decreases compared to the top of the chamber 15, for example in a range from approximately 700° F. to 800° F. It is noted that heat conduction in a bath of molten lead occurs primarily in a vertical direction (horizontal conduction is at an extremely low rate); therefore, heat consumed in converting the tire pieces 33 into gaseous hydrocarbons and nonvaporized solids must be rapidly replaced if the system is to operate continuously and at its greatest efficiency.

The vent system 20 of the apparatus 1 includes vertical tubes 150, 152, 154, 156, 158 and 160 fixedly attached to chamber 15 and flow connected thereto. The tubes 150–160 are generally evenly spaced along the inclined chamber 15 between support assemblies 111 and 117 in order to capture all the hydrocarbon gasses and other vapors produced as the tire pieces 33 migrate from the lower portion 70 to higher portion 94 of the chamber 15.

Grooves 161 located on the inner surface on the conversion chamber 15 direct hydrocarbon gasses and other vapors toward the tubes 150, 152, 154, 156, 158 and 160. Each tube 150-160 is equipped with a cap 164 threadably and removably secured to the top thereof. Although the oxygen removal unit 10 removes the majority of oxygen from the apparatus 1, small amounts of oxygen are also drawn through tubes 150, 152, 154, 156, 158 and 160. Fewer tubes could be utilized for the process of the present invention. However, six or more tubes are desirable so that if oxygen does build up in any one tube, a massive explosion that could destroy equipment and injure operators is avoided. The caps 164 are adapted to blow off if an oxygen build up occurs thereby guarding against rupture or explosion of one of the tubes 150-160.

Each of tubes 150, 152, 154, 156, 158 and 160 is also equipped with a cannister filter 175 located therewithin fixedly attached to a rod 178. Each filter 175 primarily captures dirt and sulphur emitted from the thermal conversion of the tire pieces 33. The cannister filters 175, located near the bottom 180 of each of the tubes 150, 152, 154, 156, 158 and 160 also prohibit metal pieces from entering into the tubes. The cannister filters 175 are preferably made from material suitable for capture of dirt and sulphur but having a sufficiently high melting point to prevent breakdown in contact with the molten lead, such as fiberglass. The rods 178 are used by an operator to remove the filters 175 for daily cleaning or replacement after removal of any associated cap 164.

Each of tubes 150, 152, 154, 156, 158 and 160 is flow connected to a pipe 185 that in turn flows into a main vent line 188 that is also flow connected to a hydrocarbon condenser 190. A liquid hydrocarbon receiving tank 192 flow connects to the condenser 190 and is mounted therebelow. A gas line 195 fixedly attached and flow connected to the top of the condenser 190 and having a vacuum pump 198 in flow connection therewith, is also in flow connection with the main fuel line 142 that feeds the gas burners 124. The vacuum pump 198 operationally pulls approximately ½ pounds per square inch negative pressure or vacuum on the tubes 150, 152, 154, 156, 158 and 160, thereby drawing hydrocarbon gasses and other vapors into the condenser 190 and drawing noncondensed gasses through the condenser 190 and into gas line 195. Preferably, the condenser is cooled by water or air at approximately ambient temperature and condenses most of the heavier hydrocarbons, such as conventional gasoline, to a liquid therein. Lighter hydrocarbons, such as methane, are not condensed and pass through the condenser 190.

The gas line 195 includes a valve 197 for adjusting flow of gas into the main fuel line 142. A makeup fuel line 201 connected to a source of makeup fuel 203 (such as natural gas, propane, etc.) is also flow connected to main fuel line 142. A valve 205 located on the makeup fuel line 201 is utilized for adjusting flow of fuel into the main fuel line 142 from the makeup fuel source 203.

Removal means for residual solid matter, such as is illustrated by the discharge mechanism 25 of apparatus 1 includes a vacuum system 210 and an overflow wall 215 of the reservoir 97 connected to a metal and carbon black separator 218. The vacuum system 210 includes a vacuum line 220 located above the reservoir 97 and flow connected to a carbon black receiver unit 223. A vacuum pump 225 flow connects to the receiver unit 223 near the top thereof and operably pulls a vacuum through the system 210 drawing a substantial portion of the carbon black developed in the chamber 15, especially lightweight particles of the carbon black, from the top of the reservoir 97 into the receiver unit 223.

In operation, tire pieces 33 are transported from the tire shredder 30 by means of a conveyor 36 and continuously dropped into the hopper 38. The tire pieces 33 slide down the walls 39 of the hopper 38 and land in the channel 45. The ram 64 pushes the tire pieces 33 into the infeed tube 50 where vacuum is pulled through apertures 90 in the tube 50 as the tire pieces 33 are advanced by the ram 64 into the vertical section 57 of the infeed tube 50, thereby withdrawing oxygen pieces from the tire pieces 33 that had been carried into the tube 50. Tire pieces 33 are continuously advanced through the infeed tube 50 and into the first portion 70 of the conversion chamber 15 whereat the pieces 33 are immersed in the molten lead 17 by action of the ram 64 pushing tire pieces 33 into the infeed tube 50.

Tire pieces 33 migrate in the chamber 15 from the first portion 70 toward the second portion 94. Because the tire pieces 33 have a specific gravity less than that of the molten lead, the pieces tend to "float" up the inclined chamber 15. However, chamber 15 is completely filled with molten lead, therefore the pieces 33 are generally immersed in the molten lead 17 during such travel. As the tire pieces 33 traverse the chamber 15, thermal conversion occurs and hydrocarbons and other vapors are formed. Bubbles of the gaseous hydrocarbons and the like float up through the molten lead 17 in the chamber 15 and are drawn into the tubes 150, 152, 154, 156, 158 and 160. Dirt, sulphur and other impurities are retained in the chamber 15 by the cannister filters 175. The hydrocarbon gasses and other vapors are immediately drawn into the condenser 190 by the vacuum pump 198. The vapors are cooled by conventional techniques (for example, the condenser 190 may be a shell and tube condenser with water cooling) and condensed hydrocarbons drip into the liquid hydrocarbon receiving tank 192. Noncondensed gas consisting primarily of methane is pulled into the gas line 195 by the vaccum pump 198 and circulated to the main fuel line 142 where the noncondensed gas is consumed by the gas burners 124 that heat the molten metal 17 in the chamber 15. If necessary, makeup gas 203 is added to the process gas to fire the burners 124.

The relatively rapid conversion of hydrocarbon vapor to liquid in the process of this invention is advantageous because the process tends to avoid cracking and polymerization of the hydrocarbons that may occur to the gassified hydrocarbons when subjected to elevated temperatures for a long period of time. The hydrocarbon liquid in the receiving tank 192 may then be transferred to another facility where the liquid may be further separated. As an example, for certain types of tires, the liquid breaks down to approximately twenty-five percent gasoline with a high octane rating, approximately fifty percent kerosene and approximately twenty-five percent heating oil of No. 6 grade. Experiments have shown that as much as one gallon of usable hydrocarbon fuel is collected from the conversion of each vehicle tire. Another advantage of the process of this invention is that negligible amounts of heavy hydrocarbons are produced when the hydrocarbon vapor is condensed.

Residual material including steel tire-reinforcing wires and carbon black migrate to the reservoir 97. As tire pieces 33 are introduced into the chamber 15, molten lead 17 rises in the reservoir 97. Carbon black and steel float on top of the molten lead 17 and any lead adhearing to the residual material drips back down into the molten lead portion of the reservoir 97. Thus, very little lead is lost in the process of this invention and only small amounts of lead must be periodically added to the apparatus 1. The layer of steel and carbon black also create a barrier, reducing any vapor or gaseous emission from the molten lead 17 in the reservoir 97.

Light carbon black floating to the top of the reservoir 97 is pulled into the carbon black receiver 223 through the vacuum line 220. The rest of the material floating on top of the molten lead 17 flows over wall 215 (or alternatively, is mechanically or manually pulled over the top of the wall 215) and is transported to a metal and carbon black separator 218. The separator 218 shakes and separates steel pieces from the carbon black. The steel is thereafter conveyed to a metal baler 228 and, with the carbon black, stored for later sale.

Subsequent to daily cleaning of the filters 175, the vacuum pump 198 is started and a vacuum is drawn on the system 20 prior to feeding tire pieces 33 to the chamber 15 so as to eliminate oxygen in the vent system 20 and possible explosion due to the pressure of oxygen.

It is to be understood that while certain forms of the present invention have been illustrated and described herein, it is not to be limited to the specific forms or arrangement of parts described and shown.

What is claimed and desired to be secured by Letters Patent is as follows:

1. An apparatus for thermal conversion of hydrocarbons in organic material to a gaseous state; said apparatus comprising:
   (a) an elongate tubular chamber having an upper side, a first portion and a second portion; said chamber being substantially axially inclined relative to the horizontal with said first portion lower than said second portion;
   (b) molten lead contained in and substantially filling said chamber;
   (c) a hopper for receiving the organic material;
   (d) a cylindrical infeed tube having a horizontal section and a discharge end; said horizontal section flow connected to said hopper for receiving the organic material from said hopper; said horizontal section having an outer wall with at least one aperture through said outer wall; said discharge end flow connected to said chamber first portion;
   (e) a ram located within said infeed tube horizontal section for advancing organic material from said horizontal section to said chamber first portion;
   (f) ram propelling means for operably driving said ram;
   (g) a collar circumferentially surrounding said infeed tube and flow connected to said aperture on said horizontal section;
   (h) a first vacuum line flow connected to said collar;
   (i) a first vacuum pump flow connected to said vacuum line and for drawing air from the organic material in said horizontal section through said aperture and through said collar for discharge outside of said horizontal section;
   (j) a plurality of spaced gas burners located below said chamber;
   (k) a plurality of burner fuel lines each being respectively connected to said burners; each of said burner fuel lines having a valve and connected to a main fuel line at an end thereof;
   (l) temperature control means operably sensing temperatures within said chamber and operating said fuel line valves to control heating of said chamber by each burner so as to maintain desired temperatures within each segment of said chamber;
   (m) a plurality of tubes spaced along and flow connected to said chamber upper side; each of said tubes having a filter located therein;
   (n) a condenser flow connected to each of said tubes;
   (o) a liquid flow connected to each of said tubes;
   (p) a noncondensed hydrocarbon gas line flow connected to said condenser at one end thereof and flow connected to said main fuel line at an opposite end thereof;
   (q) a second vacuum pump flow connected to said gas line and urging concondensed hydrocarbons therethrough;
   (r) a reservoir having an overflow wall; said reservoir being flow connected to said chamber;
   (s) a third vacuum line located above said reservoir;
   (t) a carbon black receiver flow connected to said third vacuum line; and
   (u) a third vacuum pump flow connected to said carbon black receiver and operably urging light carbon black particles from said reservoir to said carbon black receiver.

2. A process for the thermal conversion of materials including hydrocarbons and metal pieces to a gaseous state in a continuous manner comprising the steps of:
   (a) transferring the organic material into a trough;
   (b) ramming the organic material from the trough into an infeed tube;
   (c) pulling a vacuum on the infeed tube to remove air entrained with said organic material in said infeed tube;
   (d) ramming the organic material from the infeed tube to a lower end of an inclined chamber filled with molten lead at a temperature of approximately 650° F.;
   (e) floating the organic material from the lower end toward a higher end of the chamber with the temperature of said lead raising to approximately 950° F. near the higher end of said chamber.
   (f) drawing hydrocarbons in a gaseous state from the chamber through a tube located near an upper side of the chamber;
   (g) conveying the hydrocarbons in a gaseous state from the tube to a condenser;
   (h) cooling and condensing a portion of the hydrocarbons entering into the condenser in a gaseous state;
   (i) flowing the condensed hydrocarbons from the condenser to a liquid hydrocarbon receiving tube;
   (j) drawing noncondensed hydrocarbons from the condenser into a gas line;
   (k) conveying the noncondensed hydrocarbons to a gas burner located under the chamber and burning said noncondensed hydrocarbons to heat said chamber;
   (l) flowing nongasified residual organic material from the chamber to a reservoir;
   (m) drawing light carbon block produced from said materials during steps (a) through (e) from the top of the reservoir into a carbon black receiver;
   (n) overflowing heavy carbon black produced from said materials during steps (a) through (e) and the metal pieces from the reservoir;
   (o) separating the metal pieces and heavy carbon black; and
   (p) collecting the metal pieces.

3. An apparatus for thermal conversion of hydrocarbons in organic material to a gaseous state; said apparatus comprising:
   (a) an elongate chamber having a first portion and a second portion; said chamber having a central axis substantially inclined relative to horizontal with said first portion being lower than said second portion;
   (b) delivery means flow connected to said first portion and operably transporting organic material into said chamber first portion;
   (c) vacuum means connected to said delivery means for withdrawing air from the organic material;
   (d) molten metal contained in said chamber during operation of said apparatus;
   (e) heating means located beneath said chamber for heating said molten metal;
   (f) hydrocarbon capturing means flow connected to said chamber;
   (g) residual matter removal means connected to said second portion; said residual matter removal means including:
   (h) a reservoir having an overflow wall; said reservoir being flow connected to said second portion;
   (i) a vacuum system for drawing light carbon black particles from the top of said reservoir;
   (j) a separator for separating metal from carbon black overflowing said overflow wall; and
   (k) means for collecting said metal from said separator.

* * * * *